July 24, 1923. 1,462,809
C. H. GILL
SELF ADJUSTING TRANSMISSION MECHANISM
Original Filed July 7, 1921
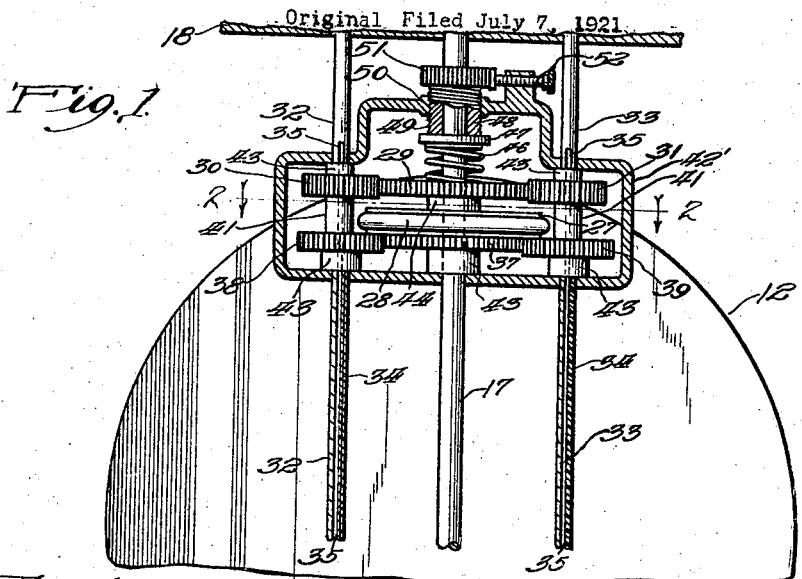
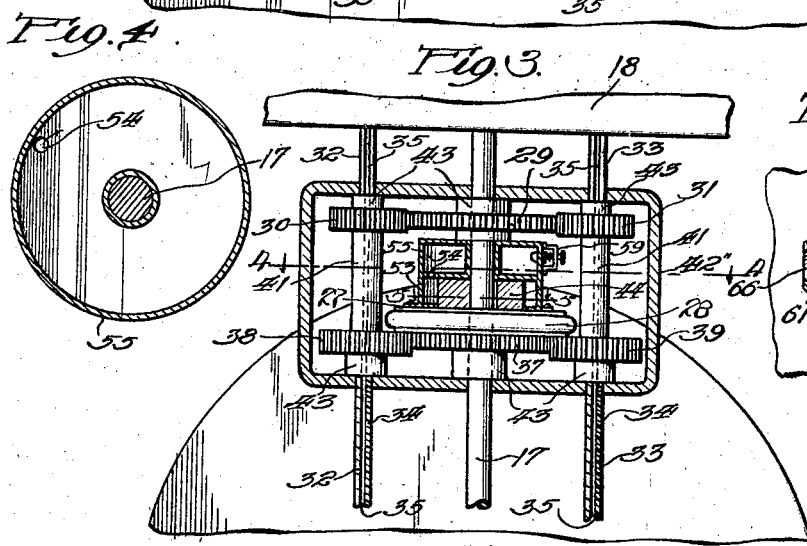
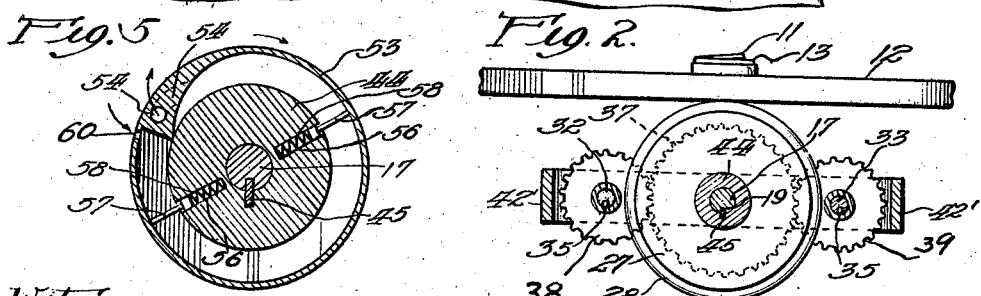
Witness: Stephen J. Rebora
Inventor: Charles H. Gill Patented July 24, 1923.

1,462,809

UNITED STATES PATENT OFFICE.

CHARLES H. GILL, OF CHICAGO, ILLINOIS.

SELF-ADJUSTING-TRANSMISSION MECHANISM.

Original application filed December 29, 1920, Serial No. 433,930. Divided and this application filed July 7, 1921, Serial No. 483,106. Renewed April 14, 1922. Serial No. 552,597.

*To all whom it may concern:*

Be it known that I, CHARLES H. GILL, a citizen of the United States, and resident of Chicago, in the county of Cook and State of Illinois, have invented a new and useful Self-Adjusting-Transmission Mechanism, of which the following is a specification.

This invention originally formed a part of my application for Letters Patent for transmission mechanism, filed December 29th, 1920, Serial No. 433,930, and has been divided out of that application. Reference may be had to the said prior application in connection with this application, which relates to mechanism for transmitting rotary motion from a driving to a driven shaft at varying speed ratios therebetween and for automatically varying the said ratios to meet variations in the resistance offered to the rotation of the said driven shaft. Reference may also be had, in connection with this application, to my Letters Patent for friction transmission mechanism, No. 1,410,747, dated March 28th, 1922.

The objects of my invention are, first, to provide a friction driving disk; second, to provide a single friction wheel driven by the said friction driving disk; third, to provide means for yieldably coupling the said friction wheel to a driven shaft; fourth, to provide automatic means for moving the said friction wheel radially of the said friction driving disk to change the ratio of the rotary speed of the said friction wheel to the rotary speed of the said friction driving disk inversely to variations in the degree of resistance offered to the rotation of the said driven shaft; and, fifth, to provide means for adjusting the said automatic means.

I attain these objects, and others as may hereinafter appear, by the mechanism illustrated in the accompanying drawings, in which—

Figure 1 is a front elevation and partly sectional view of a preferred construction of my invention, the friction driving disk and the shafts being shown partly broken away; Figure 2 is a section taken on the line 2—2 of Figure 1; Figure 3 is a front elevation and partly sectional view of a modified form of this invention, the driving friction disk and the shafts being shown partly broken away; Figure 4 is a section taken on the line 4—4 of Figure 3; Figure 5 is a section taken on the line 5—5 of Figure 3; and Figure 6 is an enlarged sectional detail of the safety valve 59.

Referring to the drawings and specifically to Figures 1 and 2, a friction disk 12 is splined upon a shaft 13 for rotation therewith, and is pressed upon by a spiral spring 11 surrounding the shaft 13. A friction wheel 27, having a band 28 of frictional material around its periphery, is loosely mounted upon a shaft 17 and is in frictional engagement with the friction driving disk 12. The friction wheel 27 has a gear wheel 37 secured thereto for rotation therewith and the gear wheel 37 engages with two internally threaded pinions 38 and 39, respectively mounted upon and in screw engagement with threaded shafts 32 and 33, set parallel to and upon opposite sides of the shaft 17. The shafts 17, 32 and 33 are rotatably journaled in the frame 18 of the machine and the threads upon the shafts 32 and 33 are designated by the numeral 34.

A collar 44 is splined upon the shaft 17 and is pressed against the flat side of the friction wheel 27 by a spiral spring 46 which surrounds the shaft 17. The opposite end of the spring 46 presses against a washer 47 on the shaft 17 and the degree of compression of the spring 46 is regulated by a sleeve 48, upon the shaft 17, provided with external threads 49 engaging with internal threads in an opening 50 through a slidable frame 42', to be later described. The sleeve 48 is provided with a milled portion 51 for convenience in adjusting and a set screw 52, set in a portion of the frame 42', is provided for holding the sleeve 48 against accidental turning.

The collar 44 has a gear wheel 29 secured thereon for rotation therewith and the gear wheel 29 engages with two pinions 30 and 31 splined upon the shafts 32 and 33 respectively. Keyways 35 are cut in the shafts 32 and 33 to depths greater than the depths of the screw threads 34 thereon, and feathers carried by the pinions 30 and 31 engage with the keyways 35.

The gear wheel 29 is slightly larger in diameter than the gear wheel 37 and the pinions 30 and 31 are correspondingly smaller than the pinions 38 and 39. A frame 42' is slidably mounted upon the shafts 17, 32 and 33, enclosing the friction wheel 27, the collar 44, the gear wheels 29 and 37 and the pinions 30, 31, 38 and 39. Loose collars 41 and 43, upon the shafts 17, 32 and 33, within the frame 42', maintain the parts within the frame 42' in fixed spaced relationship to each other and to the frame 42'.

In operation, the disk 12 is rotated with and by the driving shaft and this, in turn, rotates the engaging friction wheel 27. The collar 44, which is pressed into frictional engagement with the flat side of the friction wheel 27, tends to rotate with the friction wheel 27 and to carry the shaft 17, upon which it is splined, with it in rotation. The shaft 17 may be operatively connected in any desired way with the mechanism to be operated through this self adjusting transmission mechanism, and the shaft 17 is designated in the appended claims as the driven shaft.

The collar 44 carries with it in rotation the gear wheel 29 and this, in turn, rotates the pinions 30 and 31 in directions similar to each other and these, in turn, rotate the threaded shafts 32 and 33 upon which they are respectively splined. The friction wheel 27 carries with it in rotation the gear wheel 37 which rotates the internally threaded pinions 38 and 39 in like direction to the shafts 32 and 33 upon which they are respectively mounted and with which they respectively engage their threads. Because of the differences in the diameters of the gear wheels 29 and 37 and of their respectively engaging pinions, the shafts 32 and 33 will normally be driven a trifle faster than (but in the same directions as) the internally threaded pinions 28 and 39 thereon. Hence, the pinions 38 and 39 will screw upward upon the threaded shafts 32 and 33, carrying with them the frame 42' and its contents, and causing the friction wheel 27 to engage the friction disk 12 at progressively greater distances from the axis of the friction disk 12 and, consequently, progressively increasing the ratio of the speed of the shaft 17 to the speed of the friction disk 12.

When the resistance offered to the rotation of the shaft 17 becomes such that it partially overcomes the frictional grip of the friction wheel 27 on the collar 44 there will follow partial slippage of the collar 44 and consequent lessening of the speed of the shafts 17, 32 and 33 with respect to the speed of the pinions 38 and 39, and the upward travel of the said pinions and the frame 42' will slacken proportionately. When the slippage of the collar 44 reaches a degree sufficient to slow up the shafts 32 and 33 enough to equalize their speeds with the speed of the pinions 38 and 39 there will be no movement, either upward or downward, of the pinions 38 and 39 or of the frame 42'. When the slippage of the collar 44 becomes so great as to slow the shafts 32 and 33 below the speed of the pinions 38 and 39 these pinions and the frame 42' will be moved downwardly upon the shafts 32 and 33, causing the friction wheel 27 to approach the axis of the friction disk 12 until a point is reached where the leverage becomes sufficient to enable the collar 44 to rotate the shaft 17 without slipping in its engagement with the friction wheel 27 more than the normal amount required to maintain the pinions 38 and 39 in position upon their respective shafts without movement longitudinally of the said shafts.

In this construction it is desirable to so adjust the pressure of the spring 46 that the collar 44 will always slip in its engagement with the friction wheel 27 a trifle more readily than the friction wheel 27 will slip in its engagement with the friction disk 12. When so adjusted, there will never be any slippage of the friction wheel 27 against the friction disk 12 and, consequently, will be only the minimum of wear of the friction band 28 around the periphery of the friction wheel 27.

The modified construction illustrated in Figures 3 to 6 inclusive is identical with the preferred construction already described except that there is substituted for the frictionally engaging collar 44 and spring 46 a pneumatically engaging device. It will, therefore, be unnecessary to again describe that part of the construction that is identical.

A cylindrical casing 53 is secured upon the friction wheel 27 for rotation therewith and a rotor 44 is splined upon the shaft 17 within the casing 53. In this construction, the rotor 44 replaces and functions instead of the collar 44 in the preferred construction and the cylindrical casing 53 and associated air compression parts take the place of the spring 46 and its associated parts in the preferred construction. Herein lies the only difference between the two constructions.

The casing 53 is divided into an upper or storage chamber 55 and a lower or compression chamber. The upper chamber 55 is so constructed as to be in effect a hollow collar, the storage chamber surrounding the shaft 17 but that shaft not entering or passing through the storage chamber. The lower chamber has a portion of its casing 53 progressively thickened to form a curved cam surface which, at its thickest point, contacts with the rotor 44 and then drops abruptly in thickness to the normal thickness of the casing 53.

Slots 56 are provided in the rotor 44 in which pump blades 57 are adapted to slide. Spiral springs 58 normally urge the pump blades 57 outwardly and into contact with the casing 53. When the casing 53 is rotated with the friction wheel 27 to which it is secured, air is compressed between the blades 57 and the thick portion of the casing 53 and is forced upward through a passageway 54 into the tank or storage portion 55. When compression in the tank 55 becomes so great that the resistance to the further forcing of air therein is greater than the resistance offered to the rotation of the shaft 17 the rotor 44 will be rotated with the casing 53 on the friction wheel 27 and will carry with it in rotation the shaft 17 upon which the said rotor 44 is splined. The gear wheel 29, which is splined upon the shaft 17, will be rotated with that shaft and will, in turn, rotate the pinions 30 and 31 and, through them, the threaded shafts 32 and 33, in the same manner as in the preferred construction. The gear wheel 37, which is secured to and rotatable with the friction wheel 27, engages and rotates the internally threaded pinions 38 and 39 in the same manner and with the same results as in the preferred construction.

The storage chamber 55 is provided with a spring valve 59 as an outlet for the air that is taken into the casing 53 through the opening 60 therein and forced into the storage chamber 55 through the passageway 54 whenever the pressure of this air exceeds the pressure of a spring tending to normally hold the valve closed. This valve 59 may be of any convenient construction. As illustrated, it consists of a conical opening in the wall of the tank 55 with a conical stopper 61 fitting therein and held by pressure of a spring 62. Adjustment of the pressure with which the stopper 61 is held in place is secured by adjusting the tension of the spring 62 by means of a screw 63 which engages with internal threads in a bracket 64 secured to the casing of the tank or storage chamber 55. The screw 63 carries thereon a fixed collar 65 which presses against one end of the spring 62 and compresses that spring between the collar 65 and the stopper 61. A circular depression 66 in the stopper 61 acts as a guide for the free end of the screw 63 and a milled head 67 upon the screw 63 facilitates adjustment with it.

Since the resistance of this valve 59 to the escape of air from the storage chamber 55 determines the degree of rigidity in the engagement between the rotor 44 and the friction wheel 27, it will be evident that the tendency to slippage in this engagement will be dependent upon the adjustment of that valve, just as it is dependent upon the adjustment of the spring 46 in the preferred construction. The valve 59 should, therefore, be adjusted so that the rotor 44 will always slip in its engagement (through the air compressed in the casing 53 and storage chamber 55) a trifle more readily than the friction wheel 27 will slip in its frictional engagement with the friction disk 12.

It will be evident that numerous departures from the constructions specifically illustrated and described herein might be made without departing from the spirit of my invention. Hence, I do not wish to be understood as limiting the scope of my invention to such specific constructions or as acquiescing in any limitations to the same except such as may be imposed by the prior state of the art or included in the claims forming a part of this application.

I claim:

1. In self adjusting transmission mechanism, the combination of a friction driving disk, a friction wheel driven by said friction driving disk, a driven shaft, a member rotatable with said driven shaft, means for yieldably engaging the said member and the said friction wheel, and means controlled by the degree of yield of the said member and the said friction wheel in their engagement with each other for varying the ratio of the rotary speed of the said driven shaft to the rotary speed of the said friction driving disk inversely to variations in the degree of resistance offered to the rotation of the said driven shaft.

2. In self adjusting transmission mechanism, the combination of a friction driving disk, a friction wheel driven by said friction driving disk, a driven shaft, a member rotatable with said driven shaft, means for yieldably engaging the said member and the said friction wheel, means for adjusting the intensity of operation of the said last named means, and means controlled by the degree of yield of the said member and the said friction wheel in their engagement with each other for varying the ratio of the rotary speed of the said driven shaft to the rotary speed of the said friction driving disk inversely to variations in the degree of resistance offered to the rotation of the said driven shaft.

3. In self adjusting transmission mechanism, the combination of a friction driving member, a friction driven member engaging the said friction driving member, a driven shaft, a member adapted to rotate the said driven shaft, means for yieldably engaging the said member with the said friction driven member, and means controlled by the degree of yield of the said member in its engagement with the said friction driven member for automatically varying the ratio of the speed of the said driven shaft to the speed of the said friction driving member inversely to variations in the degree of resistance offered to the rotation of the said driven shaft.

4. In self adjusting transmission mechanism, the combination of a friction driving member, a friction driven member engaging the said friction driving member, a driven shaft, a member adapted to rotate the said driven shaft, means for yieldably engaging the said member with the said friction driven member, means for adjusting the intensity of operation of the said last named means, and means controlled by the degree of yield of the said member in its engagement with the said friction driven member for automatically varying the ratio of the speed of the said driven shaft to the speed of the said friction driving member inversely to variations in the degree of resistance offered to the rotation of the said driven shaft.

5. In self adjusting transmission mechanism, the combination of a friction driving member, a friction driven member engaging the said friction driving member, a driven shaft loosely mounting the said friction driven member, a rotatable member splined upon said driven shaft, means for yieldably engaging the said rotatable member with the said friction driven member, and means controlled by the degree of yield of the said rotatable member in its engagement with the said friction driven member under varying degrees of resistance offered to the rotation of the said driven shaft for automatically varying the ratio of the speed of the said driven shaft to the speed of the said friction driving member inversely to the variations in the said degrees of resistance offered to the rotation of the said driven shaft.

6. In self adjusting transmission mechanism, the combination of a friction driving member, a friction driven member engaging the said friction driving member, a driven shaft loosely mounting the said friction driven member, a rotatable member splined upon the said driven shaft, means for yieldably engaging the said rotatable member with the said friction driven member, means for adjusting the intensity of operation of the said last named means, and means controlled by the degree of yield of the said rotatable member in its engagement with the said friction driven member under varying degrees of resistance offered to the rotation of the said driven shaft for automatically varying the ratio of the speed of the said driven shaft to the speed of the said friction driving member inversely to the variations in the said degrees of resistance offered to the rotation of the said driven shaft.

7. In self adjusting transmission mechanism, the combination of a friction driving disk, a friction wheel rotatable by and movable radially of the said friction driving disk in continuous engagement therewith, a driven shaft loosely mounting the said friction wheel for rotation thereon and for longitudinal movement thereof and thereon, a rotatable member splined upon said driven shaft, means for yieldably engaging the said rotatable member with the said friction wheel, means for adjusting the intensity of operation of the said last named means at will, and means controlled by the degree of yield of the said rotatable member in its engagement with the said friction wheel for automatically so moving the said friction wheel radially of the said friction driving disk as to vary the ratio of the rotary speed of the said driven shaft to the speed of the said friction driving disk inversely to variations in the degree of resistance offered to the rotation of the said driven shaft.

8. In self adjusting transmission mechanism, the combination of a driving member, a driven shaft, a rotatable member loosely mounted upon the said driven shaft and driven by the said driving member, a rotatable element mounted upon the said driven shaft and adapted to rotate the said driven shaft therewith, means for yieldably engaging the said rotatable member and the said rotatable element with each other, and means controlled by the degree of yield in the engagement of the said member and the said element with each other for automatically varying the ratio of the speed of the said driven shaft to the speed of the said driving member inversely to variations in the degree of resistance offered to the rotation of the said driven shaft.

9. In self adjusting transmission mechanism, the combination of a driving member, a driven shaft, speed changing mechanism interposed between the said driving member and the said driven shaft for transmitting the rotary motion of the said driving member to the said driven shaft in varying speed ratios and including two rotatable members mounted upon the same shaft and in yieldable engagement with each other, and automatic means controlled by the degree of yield in the engagement of the said two members for varying the ratio of the rotary speed of the said driven shaft to the rotary speed of the said driving member inversely to variations in the degree of resistance offered to the rotation of the said driven shaft.

10. In self adjusting transmission mechanism, the combination of a driving member, a driven shaft, speed changing mechanism interposed between the said driving member and the said driven shaft for transmitting the rotary motion of the said driving member to the said driven shaft in varying speed ratios and including two rotatable members mounted upon the same shaft and in frictional engagement with each other, and automatic means controlled by the degree of slippage in the engagement of the said two members for varying the ratio of the rotary speed of the said driven shaft to the rotary speed of the said driving member inversely to variations in the degree of resistance offered to the rotation of the said driven shaft.

11. In self adjusting transmission mechanism, the combination of a driving friction disk, a driven shaft, a friction wheel driven by said driving friction disk and loosely mounted upon the said driven shaft for free rotation thereon and for longitudinal movement thereof and thereon, such movement being radial of the said driving friction disk, a friction member mounted upon the said driven shaft and adapted to rotate the said driven shaft therewith, means for pressing the said friction member into frictional engagement with the said friction wheel, means for adjusting the intensity of operation of the said last named means at will, and automatic means controlled by the degrees of slippage of the said friction member in its engagement with the said friction wheel under varying degrees of resistance offered to the rotation of the said driven shaft for so moving the said friction wheel longitudinally of and upon the said driven shaft and radially of the said driving friction disk as to maintain the ratio of the rotary speed of the said driven shaft to the rotary speed of the said driving friction disk inversely proportional to the degree of resistance offered to the rotation of the said driven shaft.

12. In self adjusting transmission mechanism, the combination of a driving member, a driven shaft, two members mounted upon said driven shaft in frictional engagement with each other, and automatic means controlled by the degree of slippage of the said two members in their engagement under varying degrees of resistance offered to the rotation of the said driven shaft for varying the ratio of the speed of the said driven shaft to the speed of the said driving member inversely to variations in the degree of resistance offered to the rotation of the said driven shaft.

13. In self adjusting transmission mechanism, the combination of a driving member, a driven shaft, two members mounted upon said driven shaft in yieldable engagement with each other, and automatic means controlled by the degree of yield of the said two members in their engagement under varying degrees of resistance offered to the rotation of the said driven shaft for varying the ratio of the rotary speed of the said driven shaft to the rotary speed of the said driving member inversely to variations in the degree of resistance offered to the rotation of the said driven shaft.

14. In transmission mechanism, the combination of a driving shaft, a driven shaft, speed changing mechanism operatively interposed between said shafts and including a member mounted for free rotation upon said driven shaft, an element mounted upon said driven shaft to rotate said driven shaft therewith and yieldably engaging said member, and automatic means controlled by the degree of yield in the engagement of said element with said member, above or below a given degree of yield, for so changing the relationship of the said member to the balance of the said speed changing mechanism as to vary the ratio of the rotary speed of the said driven shaft to the speed of the said driving shaft inversely to variations in the degree of resistance offered to the rotation of the said driven shaft.

15. In transmission mechanism, the combination of a driving shaft, a driven shaft, speed changing mechanism operatively interposed between said shafts and including a member mounted for free rotation upon said driven shaft, an element mounted upon said driven shaft to rotate said driven shaft therewith and frictionally engaging said member, and automatic means controlled by the degree of slippage in the engagement of said element with said member, above or below a given degree of slippage, for so changing the relationship of the said member to the balance of the said speed changing mechanism as to vary the ratio of the rotary speed of the said driven shaft to the speed of the said driving shaft inversely to variations in the degree of resistance offered to the rotation of the said driven shaft.

16. In transmission mechanism, the combination of a driving shaft, a driven shaft, speed changing mechanism operatively interposed between said shafts and including a member mounted for free rotation upon said driven shaft, an element mounted upon said driven shaft to rotate said driven shaft therewith and yieldably engaging said member, and automatic means controlled by the degree of yield in the engagement of said element with said member under varying degrees of resistance offered to the rotation of the said driven shaft, above or below a given degree of yield, for so changing the relationship of the said member to the balance of the said speed changing mechanism as to vary the ratio of the rotary speed of the said driven shaft to the speed of the said driving shaft inversely to variations in the degree of resistance offered to the rotation of the said driven shaft.

17. In transmission mechanism, the combination of a driving shaft, a driven shaft, speed changing mechanism operatively interposed between said shafts and including a member mounted for free rotation upon said driven shaft, an element mounted upon said driven shaft to rotate said driven shaft therewith and yieldably engaging said member, automatic means controlled by the degree of yield in the engagement of said element with said member under varying degrees of resistance offered to the rotation of the said driven shaft, above or below a given degree of yield, for so changing the relationship of the said member to the balance of the said speed changing mechanism as to vary the ratio of the rotary speed of the said driven shaft to the rotary speed of the said driving shaft inversely to variations in the degree of resistance offered to the rotation of the said driven shaft, and means for adjusting the intensity of the engagement between the said element and the said member.

18. In transmission mechanism, the combination of a driving friction disk, a driven shaft, a friction wheel engaging the said friction disk and rotatably and slidably mounted upon said driven shaft to be movable radially of and in engagement with said friction disk, a member splined upon said driven shaft and pressed into frictional engagement with said friction wheel, and automatic means controlled by the degree of effectiveness of the frictional engagement between the said member and the said friction wheel under varying degrees of resistance offered to the rotation of the said driven shaft for so varying the position of the said friction wheel with respect to the axis of the said friction disk as to vary the ratio of the rotary speed of the said driven shaft to the rotary speed of the said friction disk inversely to variations in the degrees of resistance offered to the rotation of the said driven shaft.

19. In transmission mechanism, the combination of a driving rotatable friction member, a driven shaft, a friction wheel engaging the said friction member and rotatably and slidably mounted upon said driven shaft to be movable with respect to the axis of the said friction member while remaining in engagement therewith, an element splined upon said driven shaft, and pressed into frictional engagement with said friction wheel, and automatic means controlled by the degree of effectiveness of the frictional engagement between the said element and the said friction wheel under varying degrees of resistance offered to the rotation of the said driven shaft for so varying the position of the said friction wheel with respect to the axis of the said friction member as to vary the ratio of the rotary speed of the said driven shaft to the rotary speed of the said friction member inversely to variations in the degree of resistance offered to the rotation of the said driven shaft.

20. In transmission mechanism, the combination of a driving rotatable friction member, a driven shaft, a friction wheel engaging the said friction member and rotatably and slidably mounted upon said driven shaft to be movable with respect to the axis of the said friction member while remaining in engagement therewith, an element splined upon said driven shaft, means adapted to press said element into frictional engagement with said friction wheel, means adapted to adjust the last named means as to the intensity of the pressure of said element against said friction wheel, and automatic means controlled by the degree of effectiveness of the frictional engagement between the said element and the said friction wheel under varying degrees of resistance offered to the rotation of the said driven shaft for so varying the position of the said friction wheel with respect to the axis of the said friction member as to vary the ratio of the rotary speed of the said driven shaft to the speed of the said friction member inversely to variations in the degree of resistance offered to the rotation of the said driven shaft.

21. In transmission mechanism, the combination of a friction driving member, a friction wheel engaging said friction driving member, a driven shaft loosely mounting said friction wheel for free rotation thereon, an element mounted upon said driven shaft for rotation therewith, pressure means adapted to press said element into frictional engagement with said friction wheel, and means for so adjusting the intensity of said pressure means that any slippage that may occur through resistance offered to the rotation of the said driven shaft will occur between the said element and the said friction wheel and not between the said friction wheel and the said friction driving member.

22. In transmission mechanism, the combination of a friction driving member, a driven shaft, a friction wheel mounted for free rotation upon said driven shaft, pressure means adapted to press the said friction driving member into frictional engagement with said friction wheel, means adapted to adjust the intensity of the pressure means aforesaid to regulate the intensity of the frictional engagement between the said friction driving member and the said friction wheel, an element mounted upon said driven shaft for rotation therewith and pressed into frictional engagement with said friction wheel, and means for adjusting the intensity of the pressure of the said element against the said friction wheel in such proportion to the intensity of the pressure of the said friction driving member against the said friction wheel as to insure slippage in the frictional engagement between the said element and the said friction wheel more readily than between the said friction driving member and the said friction wheel.

23. In transmission mechanism, the combination of a friction driving member, a friction wheel driven by said friction driving member, a shaft mounting said friction wheel for free rotation thereon, and an element secured upon said shaft for rotation therewith and frictionally engaging said friction wheel with a lesser degree of positivity than that with which the said friction driving member engages the said friction wheel.

24. In transmission mechanism, the combination of a friction driving member, a friction wheel driven by said friction driving member, a shaft mounting said friction wheel for free rotation thereon and for movement radially of the axis of said friction driving member, an element secured upon said shaft for rotation therewith and frictionally engaging said friction wheel with a lesser degree of positivity than that with which the said friction driving member engages the said friction wheel, and means controlled by the degree of effectiveness of the frictional engagement between the said element and the said friction wheel for moving the said friction wheel with respect to the axis of the said friction driving member.

25. In transmission mechanism, the combination of a shaft, a rotatable driving member mounted for free rotation upon said shaft and for movement longitudinally of and upon said shaft, a rotatable driven member mounted upon said shaft for rotation therewith and for movement longitudinally thereof and thereon and frictionally engaging the said driving member, and means controlled by the degree of slippage in the frictional engagement between said members for moving the said members longitudinally of and upon the said shaft.

26. In transmission mechanism, the combination of a shaft, a rotatable driving member and a rotatable driven member mounted upon said shaft and movable longitudinally thereof and thereon and frictionally engaging each other, and means controlled by the degree of effectiveness of the frictional engagement between the said members for moving the said members longitudinally of and upon the said shaft.

27. In transmission mechanism, the combination of a driving shaft, a driven shaft, a wheel driven by said driving shaft and rotatably mounted upon said driven shaft, an element mounted upon and secured for rotation with said driven shaft and frictionally engaging a side of the said wheel, speed changing mechanism, and means controlled by slippage of said element in its frictional engagement with said wheel for automatically adjusting the said speed changing mechanism to vary the ratio of the rotary speed of the said driven shaft to the rotary speed of the said driving shaft inversely to variations in the degree of resistance offered to the rotation of the said driven shaft.

28. In transmission mechanism, the combination of a rotatable driven wheel, a shaft mounting said driven wheel for free rotation thereon and for movement longitudinally thereof and thereon, an element splined upon said shaft and in frictional engagement with said driven wheel, and means automatically controlled by the degree of effectiveness of the frictional engagement between said driven wheel and said element and operating to cause movement of the said driven wheel and the said element in one direction longitudinally of and upon the said shaft when the degree of slippage between the said driven wheel and said element is less than a given degree and to cause the said driven wheel and the said element to have no movement longitudinally of and upon the said shaft when the degree of slippage between the said driven wheel and the said element is exactly the said given degree and to cause movement of the said driven wheel and the said element longitudinally of and upon the said shaft when the degree of slippage between the said driven wheel and the said element exceeds the said given degree, the last named movement being in direction opposite to that taken by the said driven wheel and said element when the said slippage is less than the said given degree.

29. In transmission mechanism, the combination of a friction driving member, a friction driven member engaging the said friction driving member and movable radially of the axis of said friction driving member to vary the ratio of the rotary speed of said friction driven member to the speed of said friction driving member, a driven shaft rotatably and slidably mounting the said friction driven member, an element splined upon the said driven shaft and frictionally engaging a side of the said friction driven member with a degree of intensity to normally allow of a given degree of slippage in the frictional engagement between the said friction driven member and the said element, and means controlled by any degree of slippage in said frictional engagement below the said given degree for moving the said friction driven member and the said element longitudinally of and upon the said driven shaft in such direction as to increase the ratio of the rotary speed of the said friction driven member to the speed of the said friction driving member and controlled by any degree of slippage in said frictional engagement above said given degree for moving the said friction driven member and the said element longitudinally of and upon the said driven shaft in such direction as to decrease the ratio of the rotary speed of the said friction driven member to the speed of the said friction driving member.

30. In transmission mechanism, the combination of a driven shaft, a rotatable member mounted upon said driven shaft for free rotation and longitudinal movement thereon, a driving shaft, means for transmitting rotary motion from said driving shaft to said rotatable member at speed ratios varying with the position of the said rotatable member upon the said driven shaft, an element splined upon the said driven shaft and yieldably engaging the said rotatable member in such manner as to normally allow a given degree of yield in said engagement, and means controlled by any degree of yield in said engagement below said given degree for moving the said rotatable member longitudinally of and upon the said driven shaft in such direction as to cause the said rotatable member to be rotated at a higher ratio of speed to the speed of the said driving shaft and controlled by any degree of yield in said engagement above said given degree for moving the said rotatable member longitudinally of and upon the said driven shaft in such direction as to cause the said rotatable member to be rotated at a lower ratio of speed to the speed of the said driving shaft.

CHARLES H. GILL.